Figure 1:
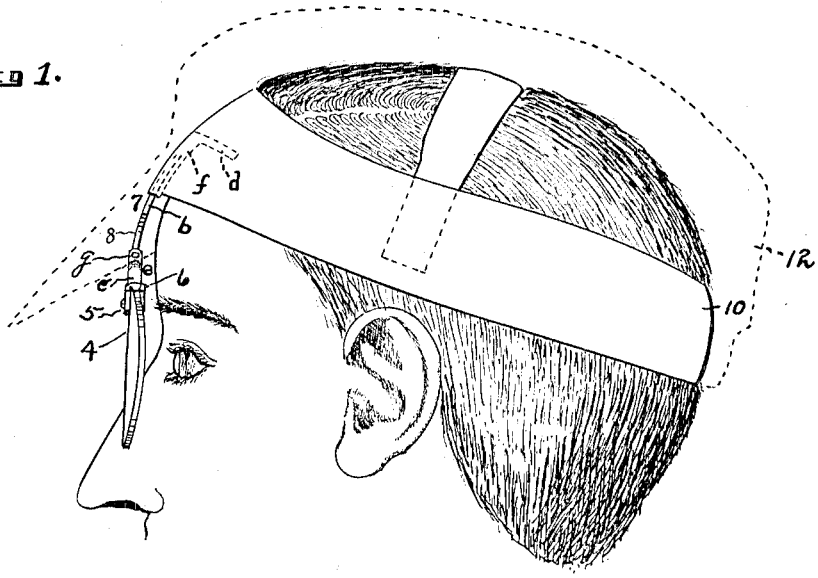

W. F. WIRTH.
LENS.
APPLICATION FILED MAR. 26, 1914.

1,118,719.

Patented Nov. 24, 1914.

Witnesses
C. E. Clark
A. B. Leyson

Inventor
William F. Wirth,
By Hiram A. Sturges,
Attorney

UNITED STATES PATENT OFFICE.

WILLIAM F. WIRTH, OF OMAHA, NEBRASKA.

LENS.

1,118,719.  Specification of Letters Patent.  Patented Nov. 24, 1914.

Application filed March 26, 1914. Serial No. 827,322.

*To all whom it may concern:*

Be it known that I, WILLIAM F. WIRTH, a citizen of the United States, residing at Omaha, in the county of Douglas and State of Nebraska, have invented certain new and useful Improvements in Lenses, of which the following is a specification.

This invention has for its principal object to provide such a construction for eyeglasses and their mounting that they may be supported entirely free from the face of the wearer to avoid the objectionable indentation, injury or irritation of the skin occasioned by the bows which usually rest upon the temples or ears, or caused by the bridge of the glasses which bears upon the nose.

The invention consists of the novel construction, combination and arrangement of parts as described herein and claimed, and as illustrated in the drawing, wherein—

Figure 2:
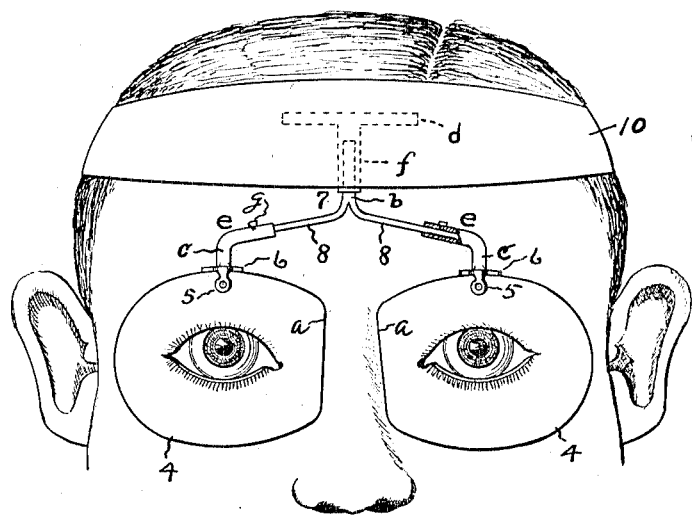
Figure 3:
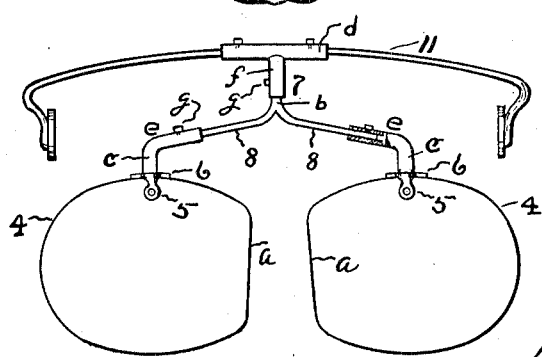

Figure 1 is an edgewise or end view of the glasses, showing them applied to the face of the wearer. Fig. 2 is a front view of the same. Fig. 3 is a view of the glasses, showing them secured to a clasping member or pair of spring-arms.

Referring now to the drawing for a more particular description numerals 4 indicate the lenses, which may be of any required size, but the larger sizes of elliptical shape are preferred, each being formed with a rectilinear edge $a$. Each lens is provided at its upper edge substantially midway of its longitudinal medial line with a clamp 5 having projections 6 engaging the edge of the lens.

At 7 is indicated a yoke, the arms 8 thereof being of equal length and projecting transversely from the stem $b$, and having transversely disposed end-portions $c$ extending substantially parallel with the stem $b$, said clamps 5 defining the lower terminals of the yoke.

In order that the lenses may be disposed and sustained at the front and at a suitable distance from the eyes, any suitable retaining member or support may be provided which may be secured upon the head of the wearer and will be comfortable when worn, as the band 10 which may circumscribe the head or the spring-clasp 11 which may be secured thereon, or the cap 12 indicated by the broken lines in Fig. 1, the operation, in all instances being that the lenses will be supported dependingly from above the eyes and will be maintained in spaced relation with reference to each other and a swinging movement will be prevented. The yoke is provided at its upper end with lateral extensions $d$ which are secured to the retaining member so that any relative swinging movement of these parts or the yoke will be prevented.

In order that suitable adjustments may be made so that the lenses may be set closer together or farther apart, each of arms 8 may have a tubular part $e$, if desired, within which they may be telescoped, it being understood that the bore of the part $e$ is of such limited diameter that any rotatable or slidable movement thereof with reference to an arm 8, during ordinary use, will be prevented, also the stem $b$ of the yoke may have a similar mounting in the tubular socket $f$ so that it may be manually adjusted for the purpose of lowering or elevating the lenses with reference to the retaining member. Also, in some instances, set-screws $g$ may be of use for firmly securing the parts in fixed relation, after the proper adjustments have been made.

Among some of the advantages to be derived by use of the invention, it may be stated that hinges generally used for glasses, which are items of expense and liable to be broken, are not employed; metallic parts generally employed and which usually discolor, indent, injure and irritate the skin, by this construction, do not make contact therewith. The weight of the lenses is supported from above the nose and eyes and they are therefore disposed dependably. The device may be economically constructed, and may be used to advantage for all purposes for which other eyeglasses are employed.

Having fully described the several parts and their uses, a further explanation relating to operation is not necessary.

What I claim as my invention and desire to secure by Letters Patent is,—

In devices for the purpose described, the combination of a retaining member, a tubular holder mounted thereon, a yoke having a stem for a seating in said holder and provided with a pair of opposed arms, a pair of tubular arms of angular shape each having a part circumscribing an arm of said yoke, a pair of lenses mounted on said tubular arms, and a keeper on each tubular arm and said tubular holder for making engagements at longitudinal intervals, respectively, with the arms of the yoke and said tubular holder.

In testimony whereof, I have affixed my signature in presence of two witnesses.

WILLIAM F. WIRTH.

Witnesses:
 HIRAM A. STURGES,
 A. F. CLARE.